United States Patent [19]

Church et al.

[11] Patent Number: 4,599,923
[45] Date of Patent: Jul. 15, 1986

[54] TOOL BIT AND HOLDER ASSEMBLY

[75] Inventors: George R. Church, Lockport; Roger J. Kocian, Worth, both of Ill.

[73] Assignee: CHUR-IAN, Ltd., Lockport, Ill.

[21] Appl. No.: 739,118

[22] Filed: May 30, 1985

[51] Int. Cl.$^4$ ............ B23B 29/04; B23B 29/24
[52] U.S. Cl. ................... 82/36 R; 407/71; 407/94; 407/108
[58] Field of Search ............ 82/36 R, 37, 13; 407/41, 49, 70, 71, 86, 87, 94, 108

[56] References Cited
U.S. PATENT DOCUMENTS

| 2,150,286 | 3/1939 | Miller | 407/94 |
| 2,183,796 | 12/1939 | Saffady | 407/87 |
| 2,449,823 | 9/1948 | Sheridan | 407/86 |
| 2,690,609 | 10/1954 | Greenleaf | 407/94 |
| 4,174,916 | 11/1979 | Kezran | 407/103 |
| 4,422,356 | 12/1983 | Pertle | 82/36 R |

FOREIGN PATENT DOCUMENTS 1033415 6/1966 United Kingdom ............... 82/36 R

Primary Examiner—Leonidas Vlachos
Attorney, Agent, or Firm—McCaleb, Lucas & Brugman

[57] ABSTRACT

A tool bit and holder assembly is disclosed wherein a tool holder having a dove-tailed tang for connection with a mounting tool post is provided with a longitudinal groove in one face thereof; the groove having parallel, longitudinally extending and angularly inclined planar side walls intersecting a planar bottom wall of the groove. A single insert tool bit of trapezoidal cross section, having longitudinally convergent, angularly inclined, planar lateral flanks fits into the tool holder groove with one flank thereof engaging one side wall of the groove. A single wedge member, having angularly inclined and longitudinally divergent planar sides engages the other side wall of the groove and the other lateral flank of the tool bit so that application of force on the wedge to move the same toward the bottom wall of the tool holder groove exerts holding force on the tool bit along three right angularly related axes to securely hold the tool bit in fixed operative position. A modified form of the single bit assembly is also disclosed for holding at least two tool bits in a holder with similar triaxially related wedge applied holding forces.

6 Claims, 8 Drawing Figures

TOOL BIT AND HOLDER ASSEMBLY

This invention relates generally to machine tools and more particularly to improvements in tool bit and tool bit holder assemblies useful therewith.

In the machining of metal work pieces, in particular, forces applied to a cutting tool bit may reach levels great enough to loosen or dislodge the tool bit from its holder. In either event damage to the work piece, loss of production time and endangerment of the operator may result. Consequently it is most important that a tool bit be rigidly held at an accurately aligned position in the tool holder. At the same time, since the cutting edge or edges of the tool bit wear, it is necessary to replace the bits from time to time. Thus some means is required for readily and conveniently removing a worn tool bit from its holder and inserting a replacement bit with minimum effort and expenditure of time.

The present invention is addressed to the above outlined problem and presents a novel assembly for positively anchoring a removeable machine tool bit in a holder to maintain the same in an accurate cutting position while affording convenient replacement of a worn bit.

In brief the improved assembly of this invention comprises a tool holder formed with an elongated groove in one face having longitudinally extending and angularly inclined planar side walls intersecting a planar bottom wall thereof. Tool bit means having longitudinally convergent, angularly inclined, planar lateral flanks is mountable in the groove of the holder with one flank thereof matingly engaging one side wall of the groove. Wedge means having longitudinally divergent and angularly inclined planar sides, fits into the groove to matingly engage the other side wall thereof and the other flank of the tool bit. Means are provided to move the wedge means toward the bottom wall of the groove to effect tri-axial wedging action on the tool bit, holding the same in a predetermined operating position. In a modified multiple tool bit version, the assembly of this invention accomodates multiple tool bit means in the tool holder groove and wedge means are provided to hold the bits in operating position with tri-axially related holding forces. In both forms of the invention means are provided for accurately locating the tool bit means longitudinally of the holder groove and additional means are employed for locating the wedge means in the holder.

It is a principle object of this invention to provide an improved machine tool bit and holder assembly.

Another important object of this invention is to provide an improved tool bit and holder assembly in which wedge means provide tri-axial wedging forces on a tool bit to hold the same in operative position.

Still another important object of this invention is to provide an improved tool bit and holder assembly in which an insert tool bit is provided with lateral flank surfaces that angularly intersect parallel top and bottom surfaces thereof for cooperative holding engagement with opposing adjacent surfaces of a tool holder and a force supplying wedge means.

It is an additional object of this invention to provide a machine tool bit and holder assembly in which an insert tool bit is tapered longitudinally and has angularly disposed flank surfaces to cooperate with mating tapered and angularly disposed wedging surfaces to effect triaxial holding forces on the tool bit.

Having described this invention, the above and further objects, features and advantages thereof will be recognized by those familiar with the art from the following detailed description of preferred and modified embodiments thereof, illustrated in the accompanying drawings and representing the best mode presently contemplated for enabling those familiar with the art to practice this invention.

IN THE DRAWINGS

DESCRIPTION OF THE PREFERRED EMBODIMENT

Figure 1:
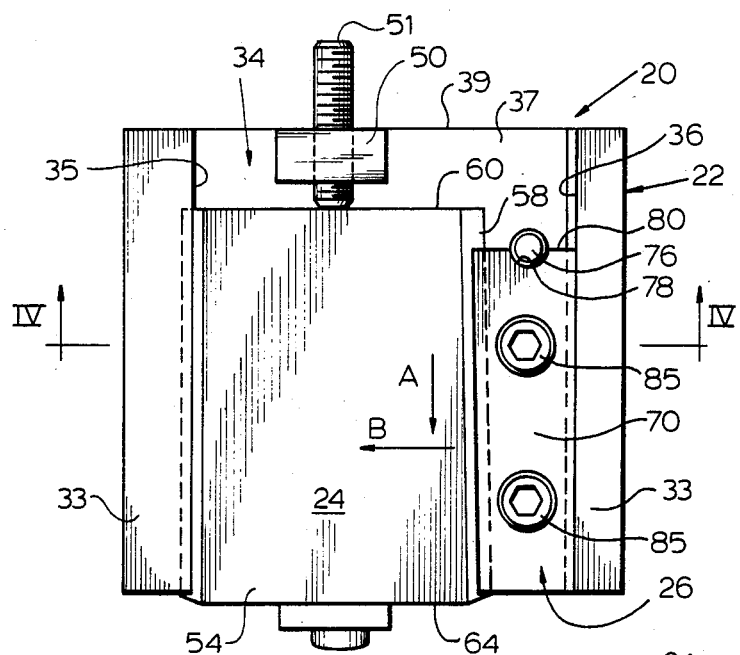
FIG. 1 is a top plan view of a single tool bit and holder assembly according to this invention.

Turning now to the embodiment of this invention illustrated in FIGS. 1-4 of the drawings, it will be recognized from FIG. 1 that the tool bit and holder assembly, indicated generally at 20, is therein shown as comprising a unitary tool holder 22, an insert tool bit means 24 and wedge means 26; the features of each of which will now be set forth in detail.

Figure 3:
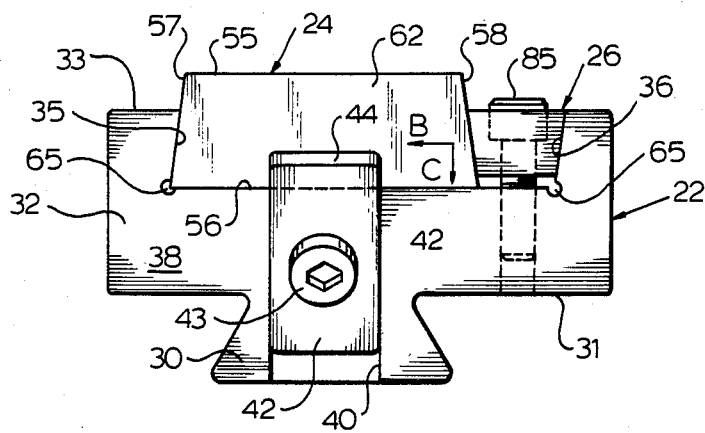
FIG. 3 is a front end elevational view thereof.

The holder means 22 of the illustrated embodiment is formed as a unitary metal block of generally rectangular plan configuration (see FIG. 1), having a lengthwise extending dove-tail tang 30 formed to project from the lower face 31 of its main body 32 (see FIG. 3). Tang 30 is designed to interlock with a tool post of a machine tool in a conventional and known manner.

The upper face 33 of the tool holder body 32 is distinguished by an elongated groove 34 formed with planar side walls 35 and 36 and bottom wall 37. Side walls 35 and 36 of the groove are parallel to one another, but are inclined to intersect bottom wall 37 of groove 34 at an angle other than 90° (see FIG. 3). As best seen from FIG. 2 of the drawings, the front end wall 38 of body 32 is angularly disposed with respect to the bottom wall 31 and the top wall 33 thereof while rear end wall 39 is normal thereto. A groove 40 is formed centrally of end wall 38 to accommodate an interfitting stop member 42 which is held in a desired position along groove 40 by means of a single socket head machine bolt 43, or similar fastening means. It also will be noted that the upper end 44 of the stop member 42 extends or projects beyond the bottom wall 37 of groove 34 of the holder body, for reasons which will appear presently.

The rearward or back face 39 of the body member 32, which is disposed at right angles to the bottom face or wall 31 of the holder body, merges with a generally rectangular shaped adjustment block portion 50 formed integrally with the body 32 and extending upwardly from bottom wall 37 of the groove 34 therein. Block 50 is bored and threaded to accommodate and received adjustment screw means 51 adapted to engage one end of the tool bit 24 for purposes of adjustably locating the front end of the tool bit snugly against the stop member 42 at the front end of the tool holder. While the illustrated embodiment herein includes the adjustable stop means 50 and 51, such addendum is optional to the successful operation of this invention, although it is usually preferred by most operators.

Figure 2:
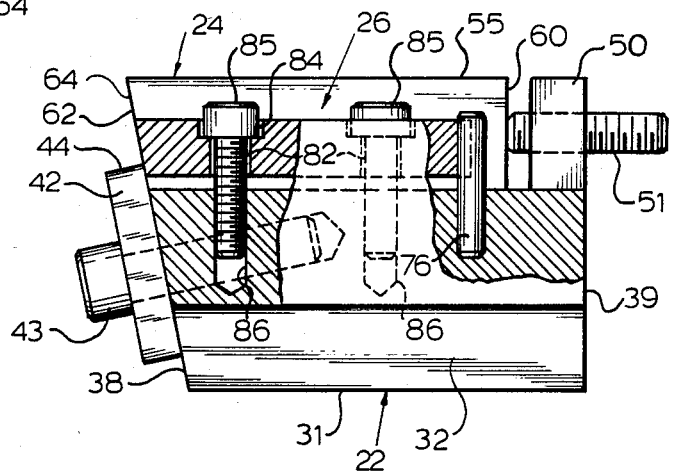
FIG. 2 is a side elevational view of the assembly illustrated in FIG. 1 with portions thereof broken away in section.
Figure 4:
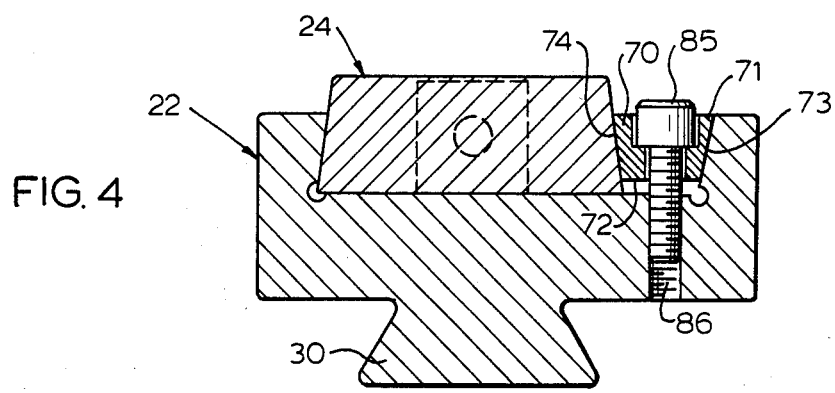
FIG. 4 is a transverse cross sectional view taken substantially along vantage line IV—IV of FIG. 1 and looking in the direction of the arrows thereof.

Turning now to the features of the tool bit means 24, specific references is made to FIGS. 1-3 of the drawings from which it will be recognized that the bit means 24 comprises a generally rectangular elongated metal body 54 having planar upper and lower walls 55 and 56, respectively and angularly disposed planar lateral flank walls 57 and 58 to provide a generally trapezoidal cross section therefor, best illustrated in FIGS. 3 and 4. Tool bit means 24 has a planar non-working or rear end 60 disposed at right angles to the upper and lower faces thereof for engagement by adjustment screw means 51. The leading end of the tool bit, as indicated at 62, is disposed at an angle to its upper and lower faces 55 and 56 with the intersection of end face 62 and upper face 55 comprising the cutting edge 64 for the tool bit in the illustrated case. In general the tool bit means 24 is made of hardened high speed steel or other suitable cutting material and may comprise a carbide tip or insert forming the cutting edge 64 in a known manner.

The one side wall 57 of the tool bit, as noted before, is disposed in angular relationship to the upper and lower faces of the body 54 and in particular is formed at an angle mating with the angular disposition of wall 35 at one side of the tool holder groove 34, as best illustrated in FIGS. 3 and 4 of the drawings. It will be noted that the lateral bottom corners of the groove 34 are each relieved by a cut out area 65 to provide clearance for the bottom corner of a tool bit operatively disposed in the holder. When the tool bit means 24 is properly mounted in the groove 34, its leading end wall or face 62 abutts the stop member 42 held in central groove 40 of the tool holder as previously noted (see FIG. 2). The tool bit means is snugged against the stop member 42 by virtue of the adjustable stop means 51 engaging the rear end wall 60 thereof. In this manner the tool bit means is adjustably positioned in and along the groove 34 so that each time the tool is sharpened, as by grinding the end face 62 thereof, adjustment of the screw means 51 serves to properly locate the cutting edge 64 of the tool bit for engagement with a work piece.

While the one flank wall 57 of the tool bit means engages the one side wall 35 of the tool holder groove as noted, the opposite flank wall 58 thereof is engaged by the wedge means 26. It will be noted in particular from FIG. 1 of the drawings that flank wall 58 of the tool bit is non-parallel with respect to the flank 57, raking back from cutting edge 64 to converge toward the plane of flank wall 57.

In order to lock tool bit means 24 securely in the groove 34 of the tool holder, according to this invention, a single wedge means is employed. Wedge means 26 comprises an elongated metal body 70 having planar, parallel upper and lower faces 71 and 72, respectively (see FIG. 4) and side walls 73 and 74 disposed in angular intersecting relationship with walls 71 and 72 to provide a trapezoidal cross section. Wall 73 is formed at an angle to mate with the angularly disposed side wall 36 of the tool holder groove 34 while wall 74 of the wedge means is formed at an angle to mate with the flank wall 58 of the tool bit 24. It will be noted in particular that the two side walls 73 and 74 of the wedge means are non-parallel or, that is, they are formed in a divergent relationship so that side wall 74 of the wedge follows the converging or angular disposition of flank 58 associated with the tool bit. Thus full wedging engagement between the wedge means and the walls 36 and 58 take place in assembly.

In order to properly locate the wedge means 26 in and along the groove 34 of the tool holder, a stop pin 76 is provided to extend at right angles upwardly from bottom wall 37 of the tool holder groove; the same constituting a generally cylindrical pin engageable in a semi-arcuate slot 78 formed in the adjacent end wall 80 of the wedge means 26. Body 70 of the wedge means is further provided with a pair of spaced vertically bored openings 82 each having a counter bore portion 84 in the upper face 71 of the wedge means and each receptive of a socket head machine bolt 85 adapted to pass through the wedge means and threadingly engage a registering threaded bore opening 86 formed in the body of the tool holder. Thus upon tightening of the bolts 85,85 the wedge means 26 is drawn toward the bottom face or wall 37 of the tool holder groove 34 to exert wedging action against the tool bit 24. In this respect it will be noted that the thickness of the wedge means is such that it is normally spaced from the bottom wall 37 of the tool holder groove when the bolts 85 are drawn down tightly (see FIGS. 2 and 4).

It is of particular importance to note that the wedge means 26 exerts tri-axial wedging forces against a tool bit to securely hold and lock the same to the holder 22. More specifically, the divergent side wall or face 74 of the wedge means and the corresponding convergent wall 58 of the tool bit, when brought into forceful engagement by tightening of the bolts 85,85, securely wedges the tool bit against rearward movement or that is movement toward the adjustable stop means 50,51. Thus, the wedge means provides a counter force against the tool bit preventing the same from moving away from the work piece. This opposing force supplied by the wedge means 26 is indicated by arrow A in FIG. 1 of the drawings.

In addition to the force preventing rearward movement of the tool bit as above described, downward movement of the wedge means between the tool bit and the wall 36 of the tool holder groove, also serves to provide lateral holding force against the tool bit or side thrust as it were in accordance with direction arrow B of FIG. 1. This lateral thrust is affected by the interengagement of the mating side faces of the wedge means with the adjacent face 58 of the tool bit and sloping slide wall 36 of the tool holder groove. Such lateral thrust on the tool bit will best be recognized from the illustration of FIG. 3 of the drawings wherein thrust arrow B is indicated.

The third axis of force applied by the wedge means against the tool bit is supplied by virtue of the downward pull or movement of the hold down bolts 85, forcing the wedge means 26 between the tool bit and one side of the tool holder groove to provide a hold down force on the tool bit as indicated by arrow C in FIG. 3 of the drawings.

Thus the wedge means provides triaxial holding force against the tool bit by virtue of its wedging engagement with the tool bit means as above described; such three axes being generally related at right angles to one another to securely interlock the tool bit with a holder in accordance with that objective of this invention.

Turning now to the features of the modified embodiment illustrated in FIGS. 5-8 of the drawings, it will be recognized that the modified assembly, indicated generally at 100, is essentially the same in principle to the assembly 20 heretofore described except that assembly 100 accomodates a multiplicity of cutter bits or tool bit means as opposed to the single tool bit version of FIGS. 1-4.

Specifically assembly 100 comprises a tool holder 102, a pair of tool bit means 104 and 106, a lateral spacer bar 108 and a central wedge means 110. In accordance with the operation of assembly 100 the two bit means 104 and 106 are held by a single wedge means and subjected to tri-axial forces thereby to secure the tool bit means in proper operating position in the holder, as will appear from the following.

With specific regard to the features of the modified holder means 102, the same comprises a generally rectangular plan profiled integral metal body 112, conforming in general respects to the shape, features and structure of holder 22 heretofore described to include a post mounting tang means 113 on its lower bottom side and an longitudinally extending groove or recess 114 formed inwardly of the upward face 115 thereof. A T-shaped stationary stop means 116 is disposed on a sloping front face 117 of the holder body; such fitting into a groove 118 in the same manner and for the same purpose as the stop means 42 heretofore described. A pair of adjustable stop means indicated at 120 and 121, respectively, and constituting a pair of rigid blocks integrally formed with body 102, threadingly receive adjustable screw members 122,122 adjacent the upper end of a rearward wall 124 of the holder body, similar to the structure and operation of the adjustable stop means 50,51 heretofore described.

The major distinction between the holder means 102 and the first described holder means 22 resides in the formation of the groove 114 in the upper face thereof. Specifically it will be noted from FIGS. 6 and 8 that the opposing planar side walls 130, 132 of the groove 114 are sloped toward one another from the planar bottom wall 133 of the groove 114 as opposed to the first described structure in which the side walls 35 and 36 of the groove 37 are disposed parallel to one another. The purpose of this change in the tool holder over that initially described herein above will be recognized in associations with the following description of the mounting of the tool bit means in the holder means 102.

Figure 5:
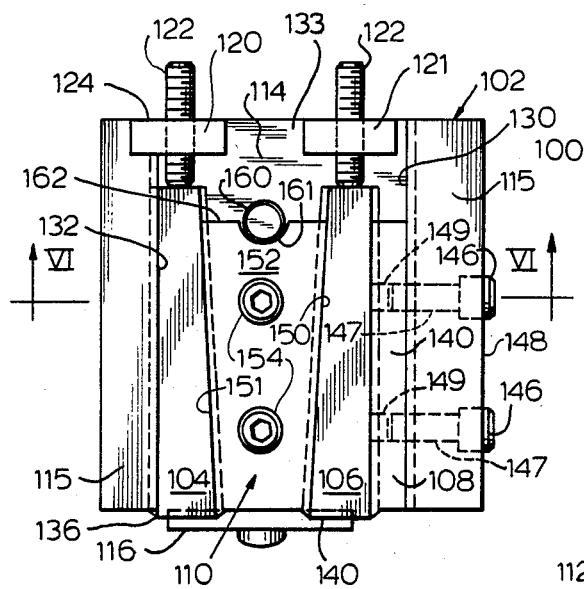
FIG. 5 is a top plan view of a modified multiple tool bit and holder assembly.
Figure 8:
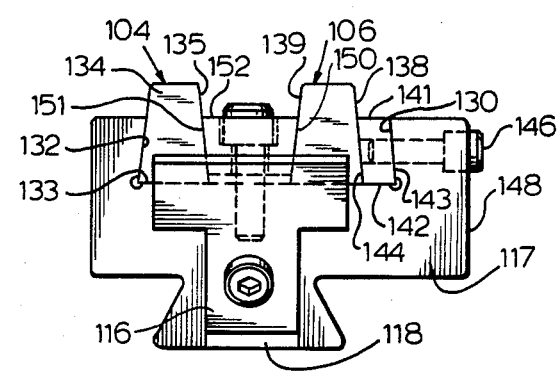
FIG. 8 is a front end elevational view of the assembly shown in FIG. 5.

As best indicated in FIGS. 5 and 8 of the drawings, each of the tool bit means 104, 106 constitutes an elongated metal body of substantially trapezoidal cross sectional configuration as in the formation of the tool bit means 24 first described. The tool bit means 104 is formed with a tapered configuration in plan view wherein opposing angulated flank walls 134 and 135 thereof converge rearwardly from a leading cutting edge 136. In a similar fashion the second tool bit 106 has angularly sloping flank walls 138 and 139 corresponding to the flanks wall 134 and 135 of tool bit means 104, that is to say having its one lateral flank 139 thereof converging toward the opposite flank wall 138 from cutting edge 140. The consequence of this arrangement (see FIGS. 5 and 8) is that the two opposing flanks 135 and 139 of the two tool bit means 104,106 respectively, are divergent from front to back of the tool holder and in their mounted position the tool bit means reside substantially symmetrically on opposite sides of a plane passing through the center of a forward stop means 116.

It will be recalled that the tool bit means 104 has a one face or flank wall 134 thereof in abutting engagement with the side wall 132 of the tool holder groove, with the angular disposition of flank 134 coinciding with the angular disposition of the side wall 132 of the groove. Correspondingly the second tool bit means 106 has its outside flank wall 138 disposed in parallel angular disposition with wall 130 of the tool holder groove, but in the particular assembly illustrated, flank wall 138 does not engage the wall 130 of the groove. Instead a spacer bar 108 having an elongated body 140 formed with parallel top and bottom walls 141, 142 and parallel side walls 143, 144 is provided and located between the tool bit means 106 and the adjacent side wall 130 of the tool holder groove. The side walls 143, 144 of the spacer bar are at an angular disposition relative to the parallel top and bottom walls thereof and at a slope or angle matching that of the side wall 130 of the tool holder groove and the outside flank wall 138 of the tool bit means 106. Spacer bar 108 is held in its operative position, as illustrated in FIG. 1 of the drawings, by a pair of spaced socket headed machine bolts 146 which pass through counter sunk bores 147 formed laterally inwardly of side wall 148 of the tool holder body and engage threaded bores 149,149 formed in the spacer bar 108. Thus by tightening the bolts 146 the spacer bar is drawn tightly against the side wall 130 of the tool holder groove 114.

Figure 6:
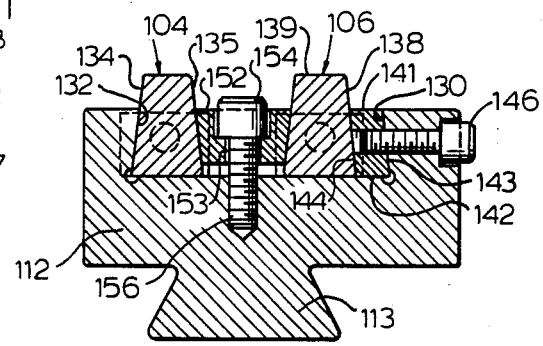
FIG. 6 is a transverse cross sectional view taken substantially along vantage line IV—IV of FIG. 5 and looking in the direction of the arrows thereon.
Figure 7:
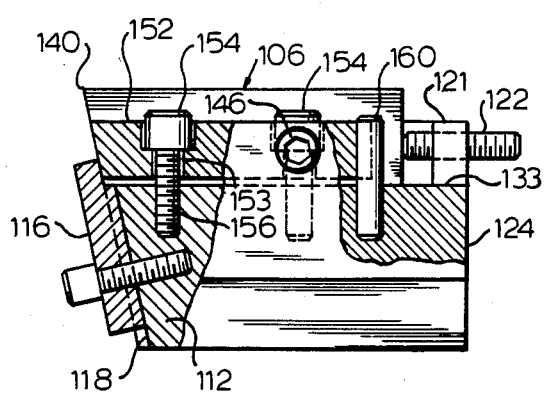
FIG. 7 is a side elevational view of the assembly illustrated in FIG. 5 with portions thereof broken away in section.

To complete the assembly 100 and provide means for holding the two tool bit means 104 and 106 in position with tri-axially related forces, the wedge means 110 is provided. As will best be recognized from FIGS. 5, 6 and 8, wedge means 110 comprises an elongated metal member having downwardly converging and rearwardly diverging side walls 150 and 151 adapted to engage the adjacent flank walls 135 and 139 of the two tool bit means 104 and 106, respectively, in operation. As best illustrated in FIG. 6 of the drawings, the cross sectional configuration of the wedge means 110 is substantially that of an inverted trapezoid with the larger base leg residing at and comprising the upper surface 152 thereof. A pair of openings 153 disposed in spaced relation along the lengthwise axis of the wedge means receive hold down bolt members 154 comprising socket headed machine bolts which pass through the openings 153 in the wedge member and threadingly engage aligned bores 156 formed in the body 112 of the holder. A stop pin 160 is provided to engage a semi-circular cut out 161 at the base end 162 of the wedge member whereby to locate the wedge member accurately between the two tool bits and lengthwise of the holder recess.

As in the previously described embodiment, applying downward pressure on the wedge means 110 by tightening the bolt members 154,154 serves to apply downward and lateral holding force on the two tool bit means; such downward and lateral forces being applied along mutually perpendicular axes. Correspondingly the lengthwise trapezoidal configuration of the wedge means 110 and its engagement with the sloping side flanks 135 and 139 of the two tool bit means serves to oppose movement of such bit means rearwardly of the tool holder, that is toward the adjustable stop means 122,122. Thus the multiple tool bit assembly 102 provides tri-axially imposed holding forces on the multiple tool bits as in the assembly 20 initially described herein.

In both forms of the invention, quick removal of the tool bit means is brought about by removal of the wedge means and loosening of the adjustable stop means.

It is believed that those familiar with the art will readily recognize and appreciate the novel advancement presented by the present invention and will understand that while the same has herein been described in association with a preferred and modified embodiments thereof, numerous changes modifications and substitution of equivalents may be carried out therein without departing from the spirit and scope of this invention which is intended to be unlimited by the foregoing description except as may appear in the following appended claims.

We claim:

1. A machine tool bit and holder assembly comprising: tool holder means comprising a unitary body having means for attachment to a mounting tool post, and a longitudinal groove formed in one planar face thereof, said groove having a planar bottom wall and parallel, longitudinally extending angularly inclined planar side walls intersecting said bottom wall; tool bit means mounted in said groove comprising an elongated metal body of generally trapezoidal cross section and formed with elongated, planar lateral flanks, the planes of which flanks converge rearwardly from a work engageable cutting edge formed at one end of said metal body; said flanks also converging upwardly from the bottom wall of said groove, one of said flanks abuttingly engaging one side wall of said groove; elongated wedge means mounted in said groove and having longitudinally divergent planar sides to matingly engage with the other flank of said tool bit means and the other side wall of said groove; and means operable to force said wedge means toward said bottom wall of said groove whereby to apply forces on said tool bit acting along three generally right angularly related axes whereby to anchor the tool bit means in operative position in said groove.

2. The invention of claim 1, and fixed stop means engaging said one end of said tool bit means to limit movement thereof toward the work piece.

3. The invention of claim 2 and adjustable stop means engaging the other end of said tool bit means and operable to force said one end of the latter against said fixed stop means.

4. The invention of claim 1, and means engaging said wedge means for locating the same longitudinally in said groove.

5. The invention of claim 1 in which said tool bit means comprises a pair of elongated tool bits of trapezoidal cross section mounted in said groove, each with longitudinally extending, angularly inclined, planar flanks converging from a cutting edge formed at one outer end thereof, and wherein said wedge means has divergently related sides each matingly engageable with one flank of one of said tool bits and operable when moved toward the bottom wall of said groove to apply tri-axially related forces on said pair of tool bits to oppose movement of the latter longitudinally and laterally in said groove as well as vertically away from said bottom wall thereof.

6. The invention of claim 5, and spacer means matingly engageable with and mounted between the other flank of one of said tool bits and the other side wall of said groove, and means for securing said spacer means in operative position.

* * * * *